United States Patent [19]

Takada

[11] Patent Number: 5,309,079
[45] Date of Patent: May 3, 1994

[54] DIGITAL THREE-PHASE PWM SIGNAL

[75] Inventor: Kazuyuki Takada, Hirakata, Japan

[73] Assignee: Matsushita Electric Industrial Co., Ltd., Kadoma, Japan

[21] Appl. No.: 63,065

[22] Filed: May 20, 1993

Related U.S. Application Data

[63] Continuation of Ser. No. 828,451, Jan. 31, 1992, abandoned.

[30] Foreign Application Priority Data

Apr. 10, 1991 [JP] Japan .................. 3-77552

[51] Int. Cl.[5] .................. H02P 5/40; H02M 5/42
[52] U.S. Cl. .................. 318/811; 318/807; 388/811; 368/41; 364/480
[58] Field of Search ............ 318/811, 599, 138, 808, 318/807; 388/811; 363/41, 98, 95, 96, 42, 97, 37; 364/480, DIG. 1

[56] References Cited

U.S. PATENT DOCUMENTS

| | | | |
|---|---|---|---|
| 4,757,241 | 7/1988 | Young | 318/138 |
| 4,767,976 | 9/1988 | Mutoh et al. | 318/808 |
| 4,878,163 | 10/1989 | Yamato et al. | 363/41 |
| 4,994,950 | 2/1991 | Gritter | 363/98 |
| 5,023,538 | 6/1991 | Mutoh et al. | 318/811 |
| 5,034,874 | 7/1991 | Araki | 363/41 |
| 5,057,989 | 10/1991 | Hirose et al. | 363/95 |

Primary Examiner—William M. Shoop, Jr.
Assistant Examiner—John W. Cabeca
Attorney, Agent, or Firm—Cushman, Darby & Cushman

[57] ABSTRACT

A clock signal is applied to an UP/DOWN counter, which counts up the clock signal from zero up to a predetermined value and then counts down from the predetermined value to zero, and thereby a triangular wave signal representing counted value is output therefrom; three threshold values which are different each other are selected between zero and the predetermined value in advance, and they are set in three digital comparators, respectively; in each digital comparator, the threshold value is compared with a level of the triangular wave signal, and when the threshold value is larger than the level of the triangular wave signal, a high level signal is output from each digital comparator, the high level signal is delayed by a predetermined delay time and three-phase PWM signal is generated.

8 Claims, 6 Drawing Sheets

DIGITAL THREE-PHASE PWM SIGNAL

This is a continuation of application Ser. No. 07/828,451, filed on Jan. 31, 1992, which was abandoned upon the filing hereof.

FIELD OF THE INVENTION AND RELATED ART STATEMENT

1. Field of the Invention

The present invention relates generally to a three-phase PWM (pulse width modulation) signal generator for controlling a three-phase motor, and more particularly to a digital three-phase PWM signal generator which is controlled by a microcomputer.

2. Description of the Related Art

Recently, digital control was introduced in an inverter and an AC servo controller for controlling a motor. In a PWM signal generator combined in such a motor control apparatus, a digitized circuit including a microcomputer is utilized.

FIG. 4 is a block diagram of a conventional digital three-phase PWM controlling apparatus for controlling the revolutions of a three-phase motor 105. Referring to FIG. 4, a plurality of time data is output from a microcomputer 100 in compliance with a predetermined program, and is applied to a three-phase PWM signal generating circuit 101 via a bus line 108. In the three-phase PWM signal generating circuit 101, three-phase PWM signals 41, 42, 43, 44, 45 and 46 are generated to control a power switching circuit 103 on the basis of the time data; and the revolutions of the three-phase motor 105 is controlled by the three-phase PWM signal 41–46. The power switching circuit 103, of known type, comprises six semiconductor switching devices 91, 92, 93, 94, 95 and 96 which control application of the voltage of a direct current power source 104 to the three-phase motor 105.

FIG. 5 is a detailed block diagram of the conventional three-phase PWM signal generating circuit 101 shown in FIG. 4. Seven registers 50, 51, 52, 53, 54, 55 and 56 are connected to the bus line 108 of the microcomputer 100, and serve to store temporarily the respective time data which is transmitted from the microcomputer 100. Timers 57, 58, 59, 60, 61, 62 and 63 are connected to the registers 50, 51, 52, 53, 54, 55 and 56, respectively in the named order, and the time data to be set to the timers 57–63 is given from the respective registers 50–56. In these timers 57–63, the timer 57 serves to generate a trigger signal to control the whole of the three-phase PWM signal generating circuit 101, and a time interval $T_{00}$ of time data is given by the microcomputer 100 through the register 50. The timer 57 issues a trigger signal 71 to six timers 58–63 at each passage of the time interval $T_{00}$. The trigger signal 71 is applied to the trigger terminals G of the timers 58–63, and thereby time measuring operations of the timers 58–63 are started. After passage of time intervals of time data given from the respective registers 51–56, the timers 58–63 output signals 58A, 59A, 60A, 61A, 62A and 63A at each output terminal Q, respectively.

FIG. 6 is waveform charts in operation of the three-phase PWM signal generating circuit 101 shown in FIG. 5. Referring to FIG. 6, a waveform "a" shows the trigger signal 71 which is output from the timer 57. The trigger signal 71 is a pulse signal having a period of the time interval $T_{00}$. The trigger signal 71 is also applied to a T flip-flop 70 (toggle flip-flop). The output signal 70A at the output Q of the T flip-flop 70 is shown by a waveform "b" of FIG. 6. The trigger signal 71 is applied to the respective trigger terminals G of the timers 58–63 to start operations of timers 58–63. Prior to start of the operations, time data to be set the timers 58–63 is transmitted from the microcomputer 100 through the respective registers 51–56. The time data, as shown by waveforms "c", "e", "g", "i", "k" and "m" of output signals 58A, 59A, 60A, 61A, 62A and 63A, is a time interval $T_{10}$ for the timer 58, is a time interval $T_{20}$ for the timer 59, is a time interval $T_{30}$ for the timer 60, is a time interval $T_{40}$ for the timer 61, is a time interval $T_{50}$ for the timer 62, and is a time interval $T_{60}$ for the timer 63. The time data of these time intervals $T_{10}$–$T_{60}$ are derived by the microcomputer 100 in compliance with a predetermined program for rotating the motor 105 with a required rotating speed.

The respective time data is set in the timers 58–63 by input of the trigger signal 71, and then time measuring operations are started simultaneously throughout the timers 58–63. After completion of the time measuring operations in the timers 58–63, the output signals 58A, 59A, 60A, 61A, 62A and 63A are output from the respective timers 58, 59, 60, 61, 62 and 63, respectively. These output signals are shown by the waveforms "c", "e", "g", "i", "k" and "m" in FIG. 6. During the time measuring operations of the timers 58–63, new time data is transmitted from the microcomputer 100 to the registers 51–56. These new time data is different from the last time data. The new time data is a time interval $T_{11}$ for the register 51, is a time interval $T_{21}$ for the register 52, is a time interval $T_{31}$ for the register 53, is a time interval $T_{41}$ for the register 54, is a time interval $T_{51}$ for the register 55, and is a time interval $T_{61}$ for the register 56.

After passage of the time interval $T_{00}$ from start, since the timer 57 outputs the trigger signal 71 again, the above-mentioned time intervals $T_{11}$–$T_{61}$ are set to the timers 58–63, respectively, and the time measuring operations are carried out on the basis of the time data which is newly set. The measuring operations in the timers 58–63 are carried out in compliance with two sets of the time data which are alternately transmitted from the microcomputer 100; and the output signals 58A–63A are output as shown in FIG. 6.

The output signals 58A, 59A, 60A, 61A, 62A and 63A are inputted to gate circuits 64A, 65A, 66A, 67A, 68A and 69A, respectively. The output signal 70A is also inputted to the gate circuits 64A–69A. The outputs of the gate circuits 64A, 65A, 66A, 67A, 68A and 69A are applied to the R-S flip-flops 64, 65, 66, 67, 68 and 69, respectively. Consequently, the output signals 41, 42, 43, 44, 45 and 46 are output from the respective R-S flip-flop 64–69 as shown by waveforms "d", "f", "h", "j", "l" and "n" in FIG. 6. These outputs signals 41–46 are called three-phase PWM signals and are applied to the power switching circuit 103 in FIG. 4.

In the above-mentioned three-phase PWM signal generator in the prior art, two sets of the time data such as the time intervals $T_{10}$–$T_{60}$ and the time intervals $T_{11}$–$T_{61}$ (12 time data in total) to be set to the timers 58–63 must be calculated and are transmitted to the registers 51–56 in synchronism with the trigger signal 71 from the timer 57. The time interval $T_{00}$ of the trigger signal 71 is preferably shortened to as short as possible to reduce the noise of the inverter apparatus or improvement of control characteristic in the AC servo controller. On the other hand, high speed data processing is required of the microcomputer 100 in order to shorten the time interval $T_{00}$. Consequently, price of the microcomputer 100 rises. There is another problem in the three-phase PWM signal generator in the prior art. For example, when an error is included in the time data transmitted to the register 51-56 due to external noise or a program error, outputs signals 41-46 with confused timings are liable to be output. Consequently, the semiconductor switching devices Q1 and Q2, for example, in the power switching circuit 103 are liable to turn ON simultaneously, and thereby the power switching circuit 103 is shortcircuited. Such a shortcircuit is very dangerous in the operation of the power switching circuit 103.

OBJECT AND SUMMARY OF THE INVENTION

An object of the present invention is to provide a digital three-phase PWM signal generator which is controllable by a microcomputer of a relatively lower processing speed in a high frequency of the three-phase PWM signal by reducing calculation process in the microcomputer.

The digital three-phase PWM signal generator in accordance with the present invention comprises:

a clock signal generating circuit for generating a clock signal of pulse having a predetermined period, an UP/DOWN counter for counting up the clock signal up to a predetermined number of pulses and for counting down from the predetermined number of pulses counted in the counting up operation, and for outputting counted value data during counting up operation and counting down operation, a first digital comparator for outputting a coincidence signal in coincidence of the counted value data in the UP/DOWN counter with zero, a first register for storing a peak value data representing the maximum counted value data in the UP/DOWN counter, a second digital comparator for comparing the counted value data in the UP/DOWN counter with the peak value data in the first register, and for outputting a coincidence signal in coincidence of the counted value data and the peak value data, a counting function switching circuit for switching the UP/DOWN counter to the counting up operation by receipt of the coincidence signal from the first digital comparator and for switching to the counting down operation by receipt of the coincidence signal from the second digital comparator, a second register for storing a threshold value data for generating a PWM signal for a first phase of a three-phase motor, a third register for storing a threshold value data for generating a PWM signal for a second phase of the three-phase motor, a fourth register for storing a threshold value data for generating a PWM signal for a third phase of the three-phase motor, a fifth register for storing the data in the second register by receipt of at least one of the coincidence signal from the first digital comparator and the coincidence signal from the second digital comparator, a sixth register for storing the data in the third register by receipt of at least one of the coincidence signal from the first digital comparator and the coincidence signal from the second digital comparator, a seventh register for storing the data in the fourth register by receipt of at least one of the coincidence signal from the first digital comparator and the coincidence signal from the second digital comparator, a third digital comparator for comparing the data of the fifth register with the data of the UP/DOWN counter, and for generating an output signal when the data of the fifth register is larger than the data of the UP/DOWN counter, a fourth digital comparator for comparing the data of the sixth register with the data of the UP/DOWN counter, and for generating an output signal when the data of the sixth register is larger than the data of the UP/DOWN counter, and a fifth digital comparator for comparing the data of the seventh register with the data of the UP/DOWN counter, and for generating an output signal when the data of the seventh register is larger than the data of the UP/DOWN counter.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
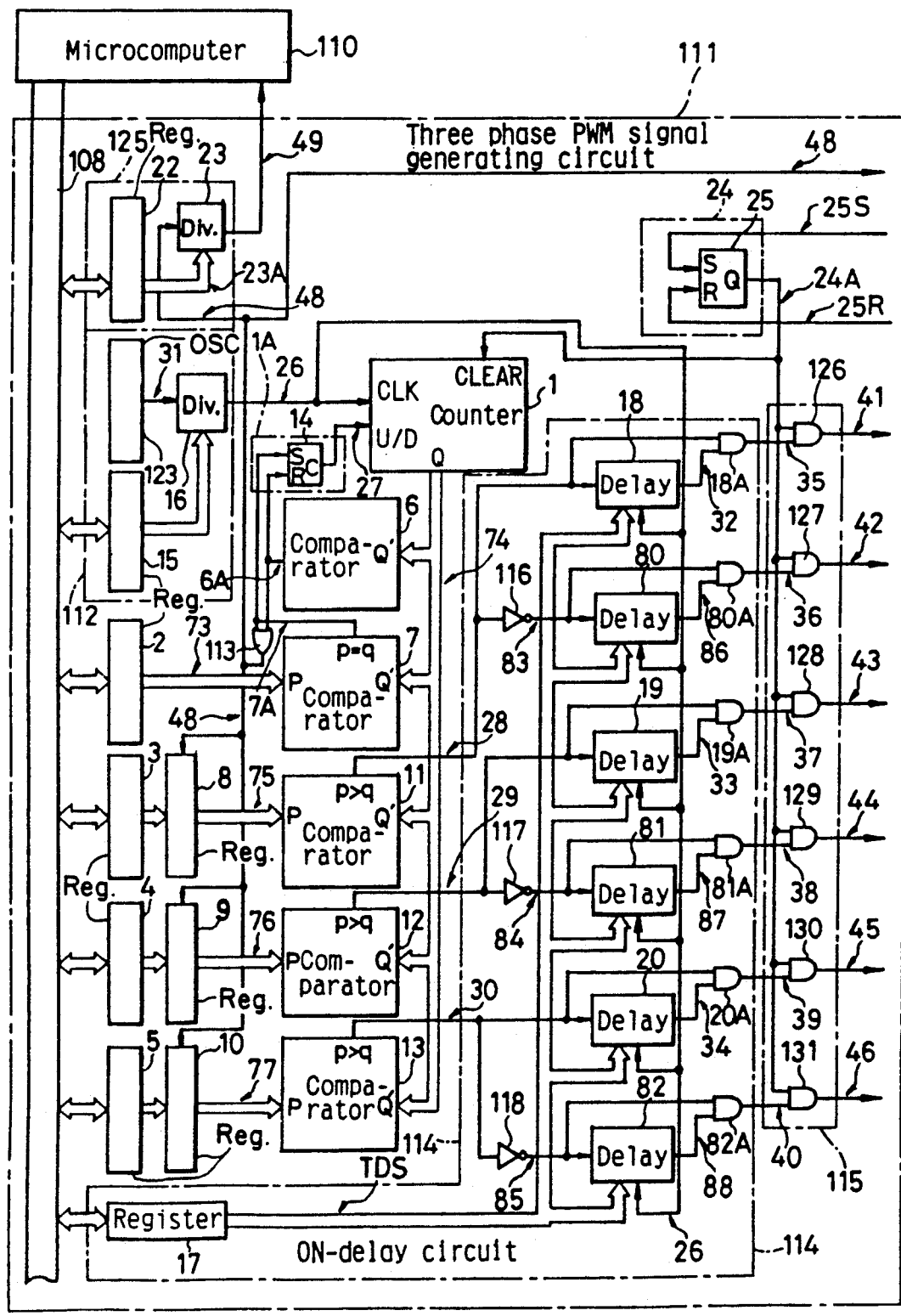
FIG. 1 is a block diagram of a three-phase PWM signal generator in the embodiment of the present invention.

FIG. 1 is a circuit block diagram of a digital three-phase PWM signal generator comprised of a microcomputer 110 and a three-phase PWM signal generating circuit 111 in an embodiment of the present invention. In the embodiment, operation of 8 bit configuration of system is exemplified. Referring to FIG. 1, seven registers 22, 15, 2, 3, 4, 5 and 17 are connected to a bus line 108 of the microcomputer 110, and temporarily store data which are transmitted from the microcomputer 110.

First, a peak value data 73 which is predetermined between 0 and 255 of binary of the 8 bit code is stored in the register 2 from the microcomputer 110.

Subsequently, data representing a predetermined dividing ratio is transmitted from the microcomputer 110 to a register 15 of a divider 112 which is composed of the register 15, a reference clock signal generator 123 and a dividing circuit 16. In the dividing circuit 16, a reference clock signal applied from the reference clock signal generator 123 is divided by the dividing ratio stored in the register 15, and a clock signal 26 is output therefrom. The clock signal 26 is applied to an UP/DOWN counter 1. The UP/DOWN counter 1 counts up or counts down the clock signal 26, and counting up operation and counting down operation are switched by a switching signal 27 (a low level or a high level) which is output from a counting function switching circuit (1A) and is applied to a control input terminal U/D.

The UP/DOWN counter 1 counts the clock signal 26 and outputs counted value data 74 represented in a digital value from an output terminal Q. The counted value data 74 represents a counted value which is presently counted in the UP/DOWN counter 1. The counted value data 74 is applied to the input terminals Q' of digital comparators 6, 7, 11, 12 and 13. In respective boxes representing the digital comparators 6, 7, 11, 12 and 13 in FIG. 1, letters "p" represent data which are inputted from an input terminal P and letters "q" represent data which are inputted from the input terminal Q'. And relations written in each box (p=q or p>q) represent conditions of comparison.

Figure 2:
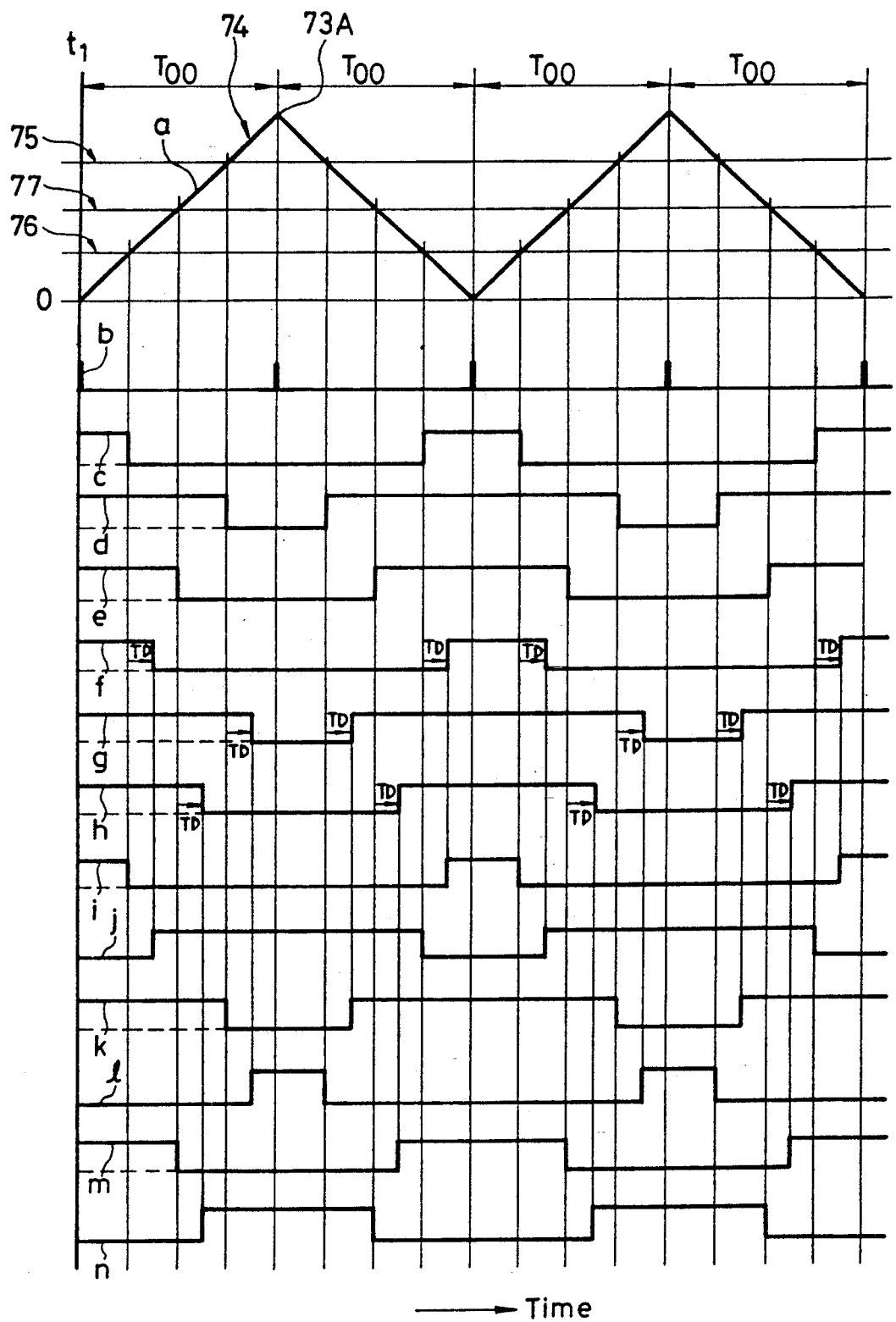
FIG. 2 is a timing chart in the operation of the embodiment.

A waveform "a" in FIG. 2 represents variation of the counted value data 74. Referring to FIG. 1, the counted value data 74 is compared with a set value "0" in the digital comparator 6, and when the counted value data 74 is equal to zero, a coincidence signal 6A having a high level is outputted. The coincidence signal 6A is applied to an input terminal R of an R-S flip-flop 14, and thereby the R-S flip-flop 14 is reset. Consequently, the switching signal 27 turns to the low level, and the UP/DOWN counter 1 starts counting up operation by input of the switching signal 27, and counts up the clock signal 26. Accordingly, the counted value data 74 linearly increases from the counted value "0" at a time $t_1$ as shown by the waveform "a" in FIG. 2.

The counted value data 74 are also applied to the digital comparators 7, 11, 12 and 13.

First, in the register 2 and digital comparator 7, the peak value data 73 corresponding to a peak 73A of the waveform "a" in FIG. 2 is stored in the register 2. The peak value data 73 is inputted to the input terminal P of the digital comparator 7. The peak value data 73 is selected to 255 and below of a binary value in the microcomputer 110 composed of 8 bit system, for example. The counted value data 74 is compared with the peak value data 73 in the digital comparator 7; and when the counted value data 74 is coincident with the peak value data 73, a coincidence signal 7A having a high level is output and is applied to the input terminal S of the R-S flip-flop 14. Consequently, the switching signal 27 which is output from the R-S flip-flop 14 turns to a high level, and the UP/DOWN counter 1 is changed to a counting down operation. After that, the counted value data 74 of the UP/DOWN counter 1 linearly decreases as shown by the waveform "a" in FIG. 2. In this way, a triangular wave signal of the waveform "a" is generated. The frequency of the triangular wave signal is 2 KHz-20 KHz, for example.

The aforementioned coincidence signals 6A and 7A from the digital comparators 6 and 7 are applied to the inputs of an OR gate 113, and hence a coincidence signal 48 shown by a waveform "b" of FIG. 2 is output from the OR gate 113.

Threshold value data 75, 76 and 77 which are transmitted from the microcomputer 110 are stored in the registers 3, 4 and 5, respectively. The threshold value data 75, 76 and 77 are derived by the microcomputer 110 in compliance with a predetermined condition between zero and a sum of "1" and the peak value data 73. In the example shown in FIG. 2, the threshold value data 75 is selected to be largest, the threshold value data 76 is selected to be smallest and the threshold value data 77 is selected to be between both the threshold value data 75 and 76. The registers 3, 4 and 5 are connected to the registers 8, 9 and 10, respectively, and the coincidence signal 48 is applied to these registers 8, 9 and 10. The data in each register 3, 4 and 5 is transmitted to the respective registers 8, 9 and 10 in synchronism with the coincidence signal 48. The threshold value data 75, 76 and 77 stored in the registers 8, 9 and 10 are applied to the input terminals P of the digital comparators 11, 12 and 13, respectively.

Simultaneously, the counted value data 74 of the UP/DOWN counter 1 is applied to the respective input terminals Q' of the digital comparator 11, 12 and 13. In the comparators 11, 12 and 13, when an input data "q" at each input terminal Q' of the comparator 11, 12 and 13 is smaller than the input data "p" at the input terminals P, each output signal of the digital comparators 11, 12 and 13 is held to a high level. On the other hand, when each input data "q" is larger than the input data "p", each output signal is held to a low level. The output signals of the comparators 11, 12 and 13 constitute three-phase PWM signals 28, 29 and 30. The three-phase PWM signals 28, 29 and 30 are applied to an ON-delay circuit 114.

The ON-delay circuit 114 comprises a register 17 connected to the bus line 108, delay circuits 18, 80, 19, 81, 20 and 82 connected to the register 17, respective inverters 116, 117 and 118 for NOT operation of the three-phase PWM signals 28, 20 and 30, and AND gates 18A, 80A, 19A, 81A, 20A and 82A.

The register 17 stores delay time data TDS which is transmitted from the microcomputer 110. The delay time data TDS is digital data to be applied to the ON-delay circuit 114. In the ON-delay circuit 114, the period of the clock signal 26 inputted to the ON-delay circuit 114 is multiplied by the delay time data TDS, and delay operation by the delay time TD is carried out. Consequently, the three-phase PWM signals 28, 29 and 30 are delayed by the delay time TD which is familiar to one skilled in the art, and three-phase PWM delay signals 32, 33 and 34 are generated. The three-phase PWM delay signals 32, 33 and 34 are generated by delaying the rise edge and fall edge of the three-phase PWM signals 28, 29 and 30 as shown in waveforms "f", "g" and "h" of FIG. 2, respectively. Thereby, for example, in the pairs of the semiconductor switching devices connected in series in the power switching circuit 103 of FIG. 3, a time difference is formed between a timing at which the semiconductor switching device Q1 turns OFF and a timing at which the semiconductor switching device Q2 turns ON, and therefore simultaneous ON-state of the semiconductor switching devices Q1 and Q2 is prevented. The delay time TD is selected in accordance with the type of t semiconductor switching device, and the delay time data TDS is set in the microcomputer 110 in advance and is not changed while the semiconductor switching devices are not changed.

In the ON-delay circuit 114, the three-phase PWM signals 28, 29 and 30 are applied to the respective inverter circuits 116, 117 and 118, and are inverted in polarity. Outputs of the inverters 116, 117 and 118 are applied to the delay circuit 80, 81 and 82.

The three phase PWM signal 28, 29 and 30 are also inputted to the delay circuits 18, 19 and 20, respectively.

The input signals to the delay circuits 18, 80, 19, 81, 20 and 82 are applied also to one of two input terminals of the AND gates 18A, 80A, 19A, 81A, 20A and 82A, respectively; and the output signals of the delay circuit 18-82 are applied to the other input terminals of the AND gates 18A-82A, respectively. The output signals of the delay circuits 18, 19 and 20 are shown by waveforms "f", "g" and "h" of FIG. 2, respectively. Waveforms of the inverted delay signals 86, 87 and 88 are omitted in FIG. 2 because they are reversed in polarity with respect to the delayed signals 32, 33 and 34, respectively.

Since the delay time data TDS of the register 17 is applied to the delay circuits 18, 80, 19, 81, 20 and 82, the number of the clock signal 26 corresponding to the value of the delay time data TDS is counted and thereby the delay time TD is derived.

The output signals 35, 36, 37, 38, 39 and 40 of the AND gates 18A, 80A, 19A, 80A, 20A and 82A are shown by waveforms "i", "j", "k", "l", "m" and "n", respectively in FIG. 2.

The output signals 35-40 are applied to a signal interception circuit 115. The signal interception circuit 115 comprises six AND gates 126, 127, 128, 129, 130 and 131, and the output signals 35-40 are applied to one of respective two input terminals of the AND gates 126-131, respectively. An output signal 24A of the output control circuit 24 is applied to the other input terminals of the respective AND gates 126-131. The output control circuit 24 has an R-S flip-flop 25, and a high level signal 25S is applied to the terminal S thereof to start the operation of the motor. Consequently, the output signal 24A turns to a high level, and output signals 41, 42, 43, 44, 45 and 46 are issued from the output terminals of the AND gates 126-131, respectively. The output signals 41-46 are applied to the power switching circuit 103 in FIG. 3.

When operation of the motor is stopped, a stop signal 25R having a high level is applied to the terminal R of the R-S flip-flop 25, and the output signal 24A turns to a low level. Consequently, the output signals 35-40 are intercepted by the AND gates 126-131, respectively, and the outputs signals 41-46 are not output to the power switching circuit 103. The output signal 24A of the R-S flip-flop 25 is also applied to a clear terminal of the UP/DOWN counter 1, and thereby the UP/DOWN counter 1 is reset to "0" when the operation of the motor is stopped.

A trigger signal generating circuit 125 comprises a register 22 connected to the bus line 108 and a divider 23, and it generates a trigger signal 49 for controlling the microcomputer 110. In the register 22, a predetermined dividing ratio data 23A is stored from the microcomputer 110 in advance, and the dividing ratio data 23A is applied to the divider 23. On the other hand, the coincidence signal 48 is inputted to the divider 23 and is frequency-divided by the dividing ratio which is inputted from the register 22. Consequently, the trigger signal 49 is output from the trigger signal generating circuit 125 and is applied to the microcomputer 110. The microcomputer 110 transmits the threshold value data 75, 76 and 77 to the registers 3, 4 and 5, respectively, when the trigger signal 49 is applied thereto. The dividing ratio which is given to the register 22 is determined in view of the processing speed of the microcomputer 110 and a switching speed of the power switching devices. In general, the dividing ratio can be selected to a relatively low ratio in the case of using a high processing speed microcomputer and power switching devices having a high switching speed.

In actual use, it is preferable that the ratio of the delay time TD of the three-phase PWM delay signals 32, 33 and 34 to the period of the three-phase PWM signals 28, 29 and 30 is constant. In the embodiment, since common clock signal 26 is applied to the UP/DOWN counter 1 and delay circuits 18, 80, 19, 81, 20 and 82, the above-mentioned condition is reliably maintained. When the power switching devices Q1-Q6 of the power switching circuit 103 are replaced with power switching devices having different switching speeds, by varying the period of the clock signal 26, the output signals 41-46 can be made changeable without varying the ratio of the delay time TD to the period of the three-phase PWM signals 28, 29 and 30. For example, in a power switching circuit using bipolar transistors, the period of the coincidence signal 48 is selected at approximately 250 $\mu$sec and the delay time TD is selected at approximately 15 $\mu$sec. On the other hand, in the case of MOS-FETs, the period of the coincidence signal 48 is selected at approximately 25 $\mu$sec and the delay time TD is selected at approximately 1.5 $\mu$sec. Therefore, when the bipolar transistors in the power switching circuit 103 are replaced with the MOS-FETs, the digital three-phase PWM signal generator can be adapted thereto, by multiplying the frequency of the clock signal 26 by ten. Moreover, in the embodiment, since the period of clock signal 26 is much shorter than that of the coincidence signal 48, change of the delay time TD can be finely carried out by changing the period of the clock signal 26.

Figure 3:
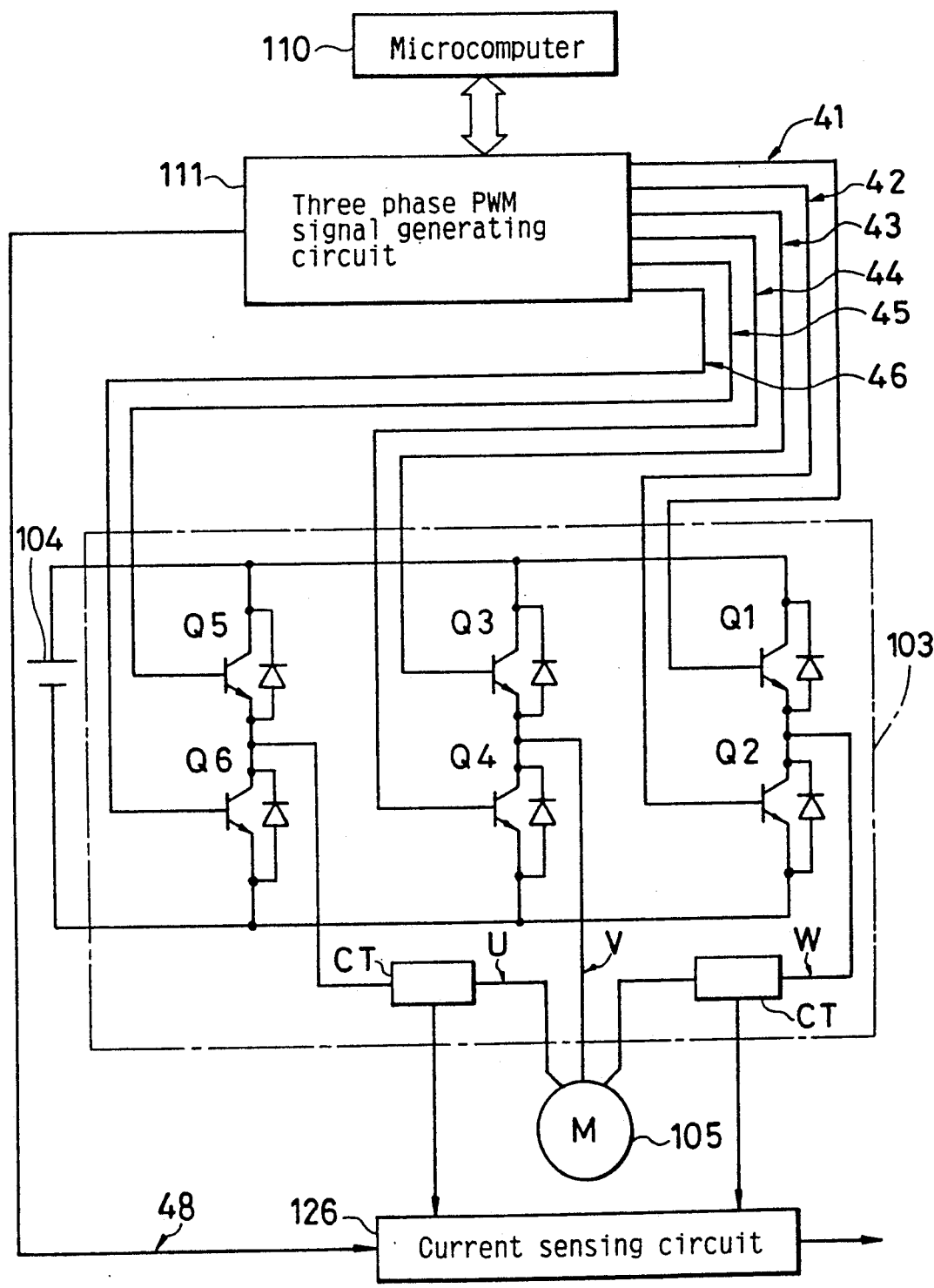
FIG. 3 is a circuit block diagram of a motor current sensing apparatus in the case that the embodiment is applied to servo control.
Figure 4:
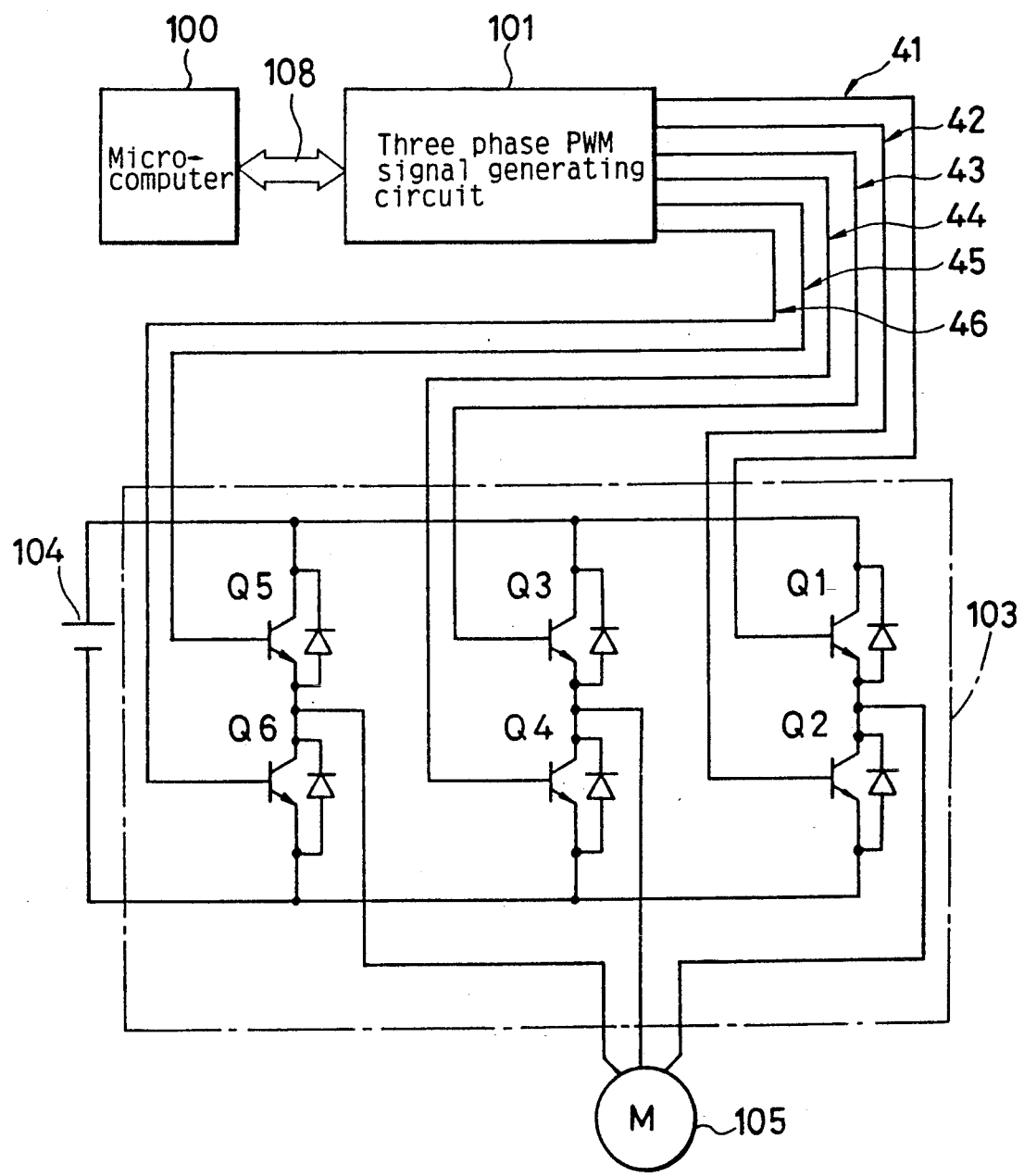
FIG. 4 is a block diagram of a three-phase motor control apparatus using a conventional digital three-phase PWM signal generating circuit.
Figure 5:
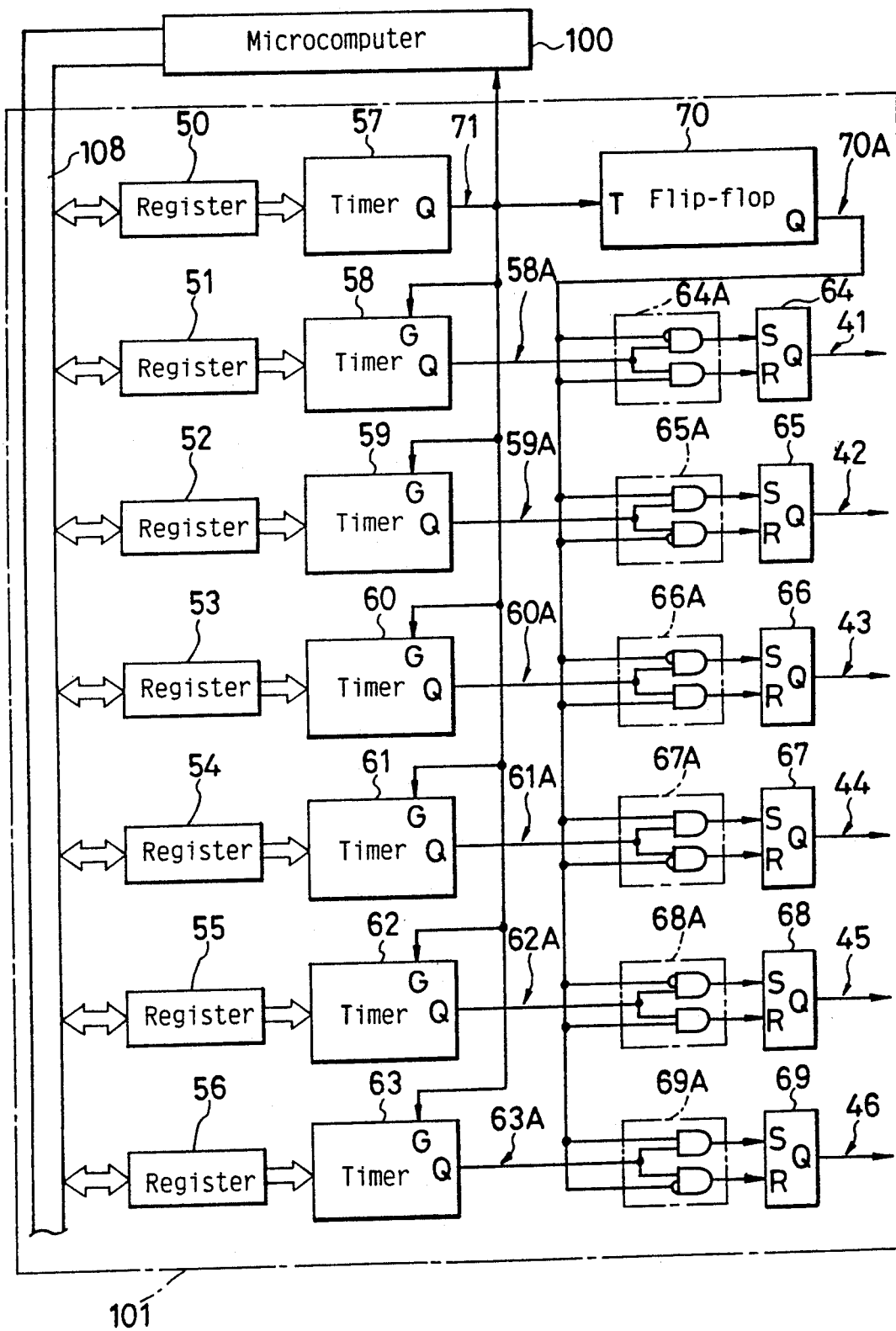
FIG. 5 is a circuit block diagram of the digital three-phase PWM signal generating circuit in the prior art.
Figure 6:
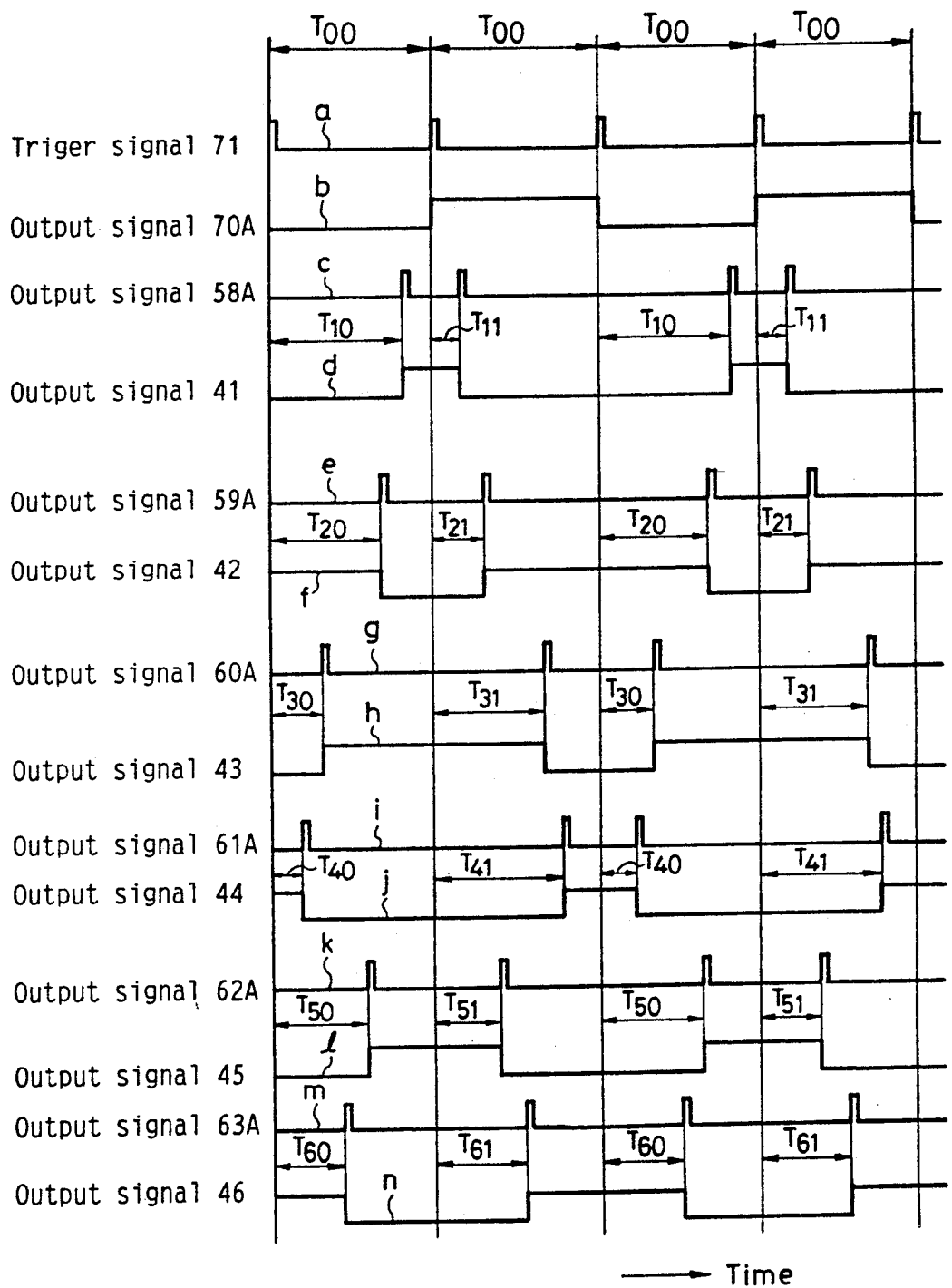
FIG. 6 is a timing chart in the operation of the digital three-phase PWM signal generating circuit shown in FIG. 5.

In the case that the digital three-phase PWM signal generator in the embodiment is applied to a motor which is combined with AC servo system or a feedback control system, the coincidence signal 48 is usable to sample and hold currents of the motor. In this case, as shown in FIG. 3, current sensors CT are mounted on at least two lines U and W of three lines U, V and W of the motor 105, and the currents of the lines U and W are sampled by the coincidence signal 48. Thus the current which is in synchronism with the revolution of the motor can be detected by means of a current sensing circuit 126.

In the above-mentioned embodiment, transmission of data from the microcomputer 110 to the registers 3, 4 and 5 is performed by applying the trigger signal 49 to the microcomputer 110. The trigger signal 49 is generated by dividing the coincidence signal 48 by the divider 25 in the trigger signal generating circuit 125. Consequently, the period of the trigger signal 49 is longer than that of the coincidence signal 48. Namely, the period of operation of the microcomputer 110 for transmitting data is longer than that of the coincidence signal 48, and therefore, a microcomputer having relatively slow processing speed can be usable. Moreover, only three registers 3, 4 and 5 are written with the time data in synchronism with the trigger signal 49 by the microcomputer 110, and the data of registers 22, 15, 2 and 17 are not changed after initialization. Therefore, relatively little data is processed in the microcomputer 110, and thus even a microcomputer having a slow processing speed is usable.

In the digital comparators 11, 12 and 13, coincidence condition between the data "p" at the input terminal P and data "q" at the input terminal Q is given by relation "p>q". In particular, the coincidence condition represented by relation "p>q" is not given. By the above-mentioned coincidence condition of the relation "p>q", the function described hereafter is realizable. When the threshold value data 75, 76 and 77 are set to the value which is larger than the peak value data 73 of the register 2, three-phase PWM signals 28, 29 and 30, which always maintain high levels, are output from the digital comparators 11, 12 and 13. On the other hand, when the threshold value data 75, 76 and 77 are set to zero, three phase PWM signals 28, 29 and 30, which always maintain low levels, are output. Consequently, the output signals 41-46 which take 100% or 0% of duty ratio are output, and switching operation of the switching devices Q1-Q9 of the power switching circuit 103 is stopped. Such operation is special control method of the motor 105 which is carried out within a limited time interval in revolution of the motor 105, and thereby, the maximum dynamic range is realizable in the control range of the digital three-phase PWM signal generator.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications that fall within the true spirit and scope of the invention.

What is claimed is:

1. A digital three phase PWM signal generator comprising:
   a clock signal generating circuit for generating a clock signal of pulse having a predetermined period,
   an UP/DOWN counter for counting up said clock signal up to a predetermined number of pulses and for counting down from said predetermined number of pulses counted in the counting up operation, and for outputting counted value data during counting up operation and counting down operation,
   a first digital comparator for outputting a coincidence signal in coincidence of said counted value data in said UP/DOWN counter with zero,
   a first register for storing a peak value data representing the maximum counted value data in said UP/DOWN counter,
   a second digital comparator for comparing said counted value data in said UP/DOWN counter with said peak value data in said first register, and for outputting a coincidence signal in coincidence of said counted value data and said peak value data,
   a counting function switching circuit for switching said UP/DOWN counter to said counting up operation by receipt of said coincidence signal form said first digital comparator and for switching to said counting down operation by receipt of said coincidence signal from said second digital comparator,
   a second register for storing a threshold value data for generating a PWM signal for a first phase of a three-phase motor,
   a third register for storing a threshold value data for generating a PWM signal for a second phase of said three-phase motor,
   a fourth register for storing a threshold value data for generating a PWM signal for a third phase of said three-phase motor,
   a fifth register for storing the data in said second register by receipt of at least one of said coincidence signal from said first digital comparator and said coincidence signal from said second digital comparator,
   a sixth register for storing the data in said third register by receipt of at least one of said coincidence signal from said first digital comparator and said coincidence signal from said second digital comparator,
   a seventh register for storing the data in said fourth register by receipt of at least one of said coincidence signal from said first digital comparator and said coincidence signal from said second digital comparator,
   a third digital comparator for comparing the data of said fifth register with the data of said UP/DOWN counter, and for generating an output signal when the data of said fifth register is larger than the data of said UP/DOWN counter,
   a fourth digital comparator for comparing the data of said sixth register with the data of said UP/DOWN counter, and for generating an output signal when said data of said sixth register is larger than the data of said UP/DOWN counter, and
   a fifth digital comparator for comparing the data of said seventh register with the data of said UP/DOWN counter, and for generating and output signal when said data of said seventh register is larger than said data of said UP/DOWN counter.

2. A digital three PWM signal generator in accordance with claim 1, wherein
   said clock signal generating circuit comprises an eighth register for storing a dividing ratio and a dividing circuit for dividing a reference clock signal which is applied from a reference clock signal generator in compliance with said dividing ratio stored in said eighth register.

3. A digital three PWM signal generator in accordance with claim 1, further comprises:
   a ninth register for storing value data corresponding to a predetermined delay time,
   an inverting circuit for inverting phases of the respective output signals of said third, fourth and fifth digital comparators, respectively,
   delay circuits for delaying said outputs of said third, fourth and fifth digital comparators by a time interval corresponding to said value data stored in said ninth register,
   a first inverting circuit for inverting phase of an output signal of said third digital comparator,
   a second inverting circuit for inverting phase of an output signal of said fourth digital comparator,
   a third inverting circuit for inverting phase of an output signal of said fifth digital comparator,
   a first delay circuit for delaying said output signal of said third digital comparator by a time interval corresponding to said value data stored in said ninth register,
   a second delay circuit for delaying said output signal of said fourth digital comparator by a time interval corresponding to said value data stored in said ninth register,
   a third delay circuit for delaying said output signal of said fifth digital comparator by a time interval corresponding to said value data stored in said ninth register, a fourth delay circuit for delaying an output signal inverted by said first inverting circuit by a time interval corresponding to said value data stored in said ninth register, a fifth delay circuit for delaying an output signal inverted by said second inverting circuit by a time interval corresponding to said value data stored in said ninth register, a sixth delay circuit for delaying an output signal inverted by said third inverting circuit by a time interval corresponding to said value data stored in said ninth register, a first AND gate to which the input signal of said first delay circuit is inputted to the first input terminal thereof and the output signal of said first delay circuit is inputted to a second input terminal thereof, a second AND gate to which the input signal of said second delay circuit is inputted to a first input terminal thereof, and the output signal of said second delay circuit is inputted to the second input terminal thereof, a third AND gate to which the input signal of said third delay circuit is inputted to a first input terminal thereof, and the output signal of said third delay circuit is inputted to the second input terminal thereof, a fourth AND gate to which the input signal of said fourth delay circuit is inputted to a first input terminal thereof, and the output signal of said fourth delay circuit is inputted to a second input terminal thereof, a fifth AND gate to which the input signal of said fifth delay circuit is inputted to a first input terminal thereof, and the output signal of said fifth delay circuit is inputted to a second input terminal thereof, and a sixth AND gate to which the input signal of said sixth delay circuit is inputted to a first input terminal thereof, and the output signal of said sixth delay circuit is inputted to a second input terminal thereof.

4. A digital three PWM signal generator in accordance with claim 1, 2 or 3, wherein a microcomputer is configured to generate time data to be stored in said first register, said second register, said third register, said fourth register and ninth register.

5. A digital three PWM signal generator in accordance with claim 1 further comprising:

a tenth register for storing the data of a predetermined dividing ratio, and a second dividing circuit for dividing coincidence signals outputs from said first digital comparator and said second digital comparator with said dividing ratio stored in said tenth register.

6. A digital three PWM signal generator in accordance with claim 1 or 3, further comprises:

data holding means for outputting an output signal by inputting a stop signal to stop revolution of said motor and for distinguishing said output signal by input of a start signal to start revolution of said motor, and a gate circuits connected to said output of said data holding means at first input terminal of each gate circuit, and connected to the output of said AND gate at the second input terminal thereof and interrupt transmission of said outputs of the AND gates during the output of said data holding means is output.

7. A digital three PWM signal generator in accordance with claim 1, wherein said UP/DOWN counter, said third digital comparator, said fourth digital comparator and said fifth digital comparator comprise 8-bit data processing circuits.

8. A digital three PWM signal generator in accordance with claim 1, further comprises:

at least two current sensing means for detecting currents of at least two phases of three-phases of said three-phases motor, and sampling means for sampling detected currents of said current sensing means by said coincidence signals of said first comparator and said second comparator.

* * * * *